United States Patent [19]

Takemura et al.

[11] 4,439,485

[45] Mar. 27, 1984

[54] ELECTRIC DISCHARGE RECORDING MATERIALS

[75] Inventors: Shuji Takemura, Chiba; Yoshihiko Kawano; Kazumi Hirakawa, both of Tokyo, all of Japan

[73] Assignee: Honshu Seishi Kabushiki Kaisha, Tokyo, Japan

[21] Appl. No.: 316,051

[22] Filed: Oct. 28, 1981

[30] Foreign Application Priority Data

Oct. 31, 1980 [JP] Japan ................................ 55-153463

[51] Int. Cl.[3] .......................... B05D 5/12; B32B 5/16; B41M 5/24

[52] U.S. Cl. .................................... 428/323; 162/138; 346/150; 346/135.1; 427/121; 427/122; 427/146; 427/180; 427/202; 427/212; 427/214; 428/206; 428/209; 428/211; 428/327; 428/403; 428/407; 428/913

[58] Field of Search ........ 162/138; 346/150, 162–164, 346/135.1; 427/121, 122, 146, 180, 212, 202, 214; 428/206, 207, 209, 211, 323, 403, 407, 537, 913, 914, 327

[56] References Cited

U.S. PATENT DOCUMENTS 3,509,088 4/1970 Dalton .............................. 346/135.1

*Primary Examiner*—Bruce H. Hess

*Attorney, Agent, or Firm*—Armstrong, Nikaido, Marmelstein & Kubovcik

[57] ABSTRACT

A discharge recording material produced by successively forming a colored layer comprising mainly carbonblack and a binder, a deposited metal layer and optionally a protective layer on a support is provided. In particular, the discharge recording material wherein said carbonblack being carbonblack aggregates obtained by pretreating carbonblack particles with a plasticizer is provided.

8 Claims, 3 Drawing Figures

1μm

10μm

10μm

ELECTRIC DISCHARGE RECORDING MATERIALS

BACKGROUND OF THE INVENTION

The present invention relates to an electric discharge recording material, more particularly to an improved electric discharge recording material by using aggregated carbonblack particles.

Conventionally, it has been known that this kind of electric discharge recording materials have various kinds of disadvantages. For example, the well known electric discharge recording materials having exposed, deposited metal layer has the following disadvantages:

(1) the surface layer has high metallic luster and the contrast between a recorded image area and the non-imaged area is low, since the surface layer consists of a deposited metal layer and therefore, the image is not clear;

(2) the writing property is not good;

(3) since the surface is relatively smooth, the contact resistance between the layer recorded and the recording needle is very low, the large amount of current is instantaneously passed through when the electric potential is applied therebetween, this leads to a severe destruction of the layer to be recorded, and thereby the reproducibility of the dots becomes bad and the printing image is inferior in its sharpness and becomes unclear.

(4) a potential difference is caused between the carbonblack particles and the deposited metal layer, due to the conductiveness of the carbonblack contained in the colored layer, the potential difference causing an electrochemical corrosion of the deposited metal, in other words such discharge recording material has low shelf stability, while the corrosion is advanced more and more, the original conductivity of the deposited metal layer decreases and therefore, bad recording is resulted.

In order to overcome these disadvantages, it is also well known that a protective layer has been applied on the deposited metal layer. However, in such electric discharge recording material having the protective layer, the following disadvantages are resulted in:

(5) similar to the said item 4, the corrosion of the deposited metal layer is caused, thereby unsatisfactory results are obtained, such as bad appearance, poor recording property etc.

In order to solve said disadvantages particularly the problem of the shelf stability, Japanese Laid-Open No. 63948/1975 discloses a method in which the colored layer of the discharge recording material is constituted from carbonblack and a resin and the surface electrical resistance of said colored layer is confined to a range of $10^8$ to $10^{11}$ $\Omega/cm^2$. However, if the colored layer is highly insulated state, this causes disadvantages such that the spark noise due to discharge is significant and the sharpness of the edges of the printing image is bad. In addition, problems such that the leak of discharge is caused on the return electrode and thereby the drawing of an image becomes impossible are caused since a significantly large load is subjected to the deposited metal layer.

Under such circumstances, Japanese Patent Publication No. 15416/1979 teaches the use of a carbonblack graft polymer as a pigment and Japanese Laid-Open No. 73145 teaches the use of a barrier layer between the colored layer and the deposited layer in order to improve said disadvantages.

Furthermore, the process which comprises incorporating an organic or inorganic pigment such as silica, alumina to the colored layer to roughen the surface of the colored layer and thereby pseudo-whitening the surface, is disclosed in Japanese Laid-Open No. 38551/1975. However, in this process, the following disadvantages are resulted owing to the use of the generally broad size distribution of the pigment to be incorporated; the surface roughness of the recording layer becomes too large, and the dots resulting from discharge are likely to be nonuniform. Moreover, discharge on the return electrode is likely to be caused. This is because the deposited layer is destroyed by the increased current density on the return electrode at the time of recording due to considerably high contact resistance between the return electrode and the recording layer. In addition, depending on the chemical and physical properties of the pigment used for roughening the surface of the metal layer, it is observed that the corrosion of the deposited metal layer is accelerated, scanning line of the recording needle become more remarkable and the like.

SUMMARY OF THE INVENTION

It is an object of the present invention to provide a novel electric discharge recording material improved which does not show the above mentioned disadvantages of the conventional one.

It is another object of the invention to provide a process for preparing a new improved electric discharge recording material.

The above mentioned and still another objects and the characteristic feature of the present invention will become more clearer by referring to the following detailed description of the present invention.

According to the present invention, an electric discharge recording material which comprises a supporting material and (i) a colored layer, the principal components thereof being carbonblack and an adhesive and the carbonblack being aggregates obtained by pretreating carbonblack particles with a plasticizer, (ii) a deposited metal layer and optionally, (iii) a protective layer applied on the support in said order, is provided.

Thus, according to the present invention, the electric discharge recording material having an excellent printing characteristic, shelf life, writing quality and a deposited metal layer being pseudo-whitened is obtained, and thereby clear images may be obtained.

DETAILED DESCRIPTION OF THE INVENTION

Figure 1:
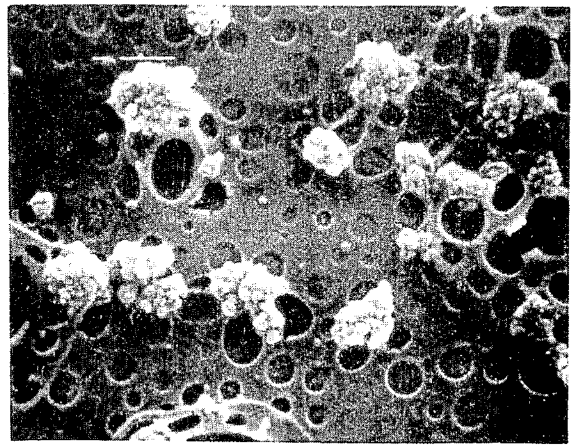

Attached FIG. 1 is an electron photomicrograph showing the aggregated state of the carbonblack particles according to the present invention.

Figure 2:
Figure 3:
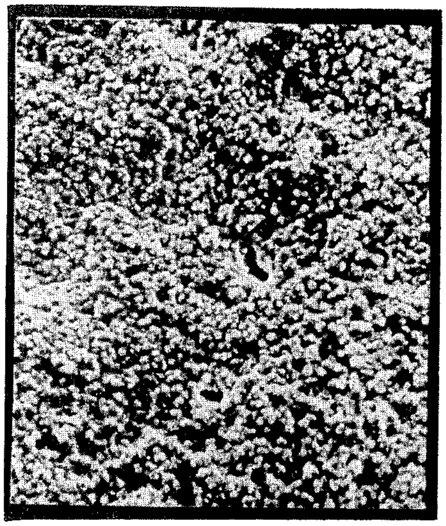

FIGS. 2 and 3 are also electron photomicrographs showing the surface state of the colored layers of a control and of the electric discharge recording material according to the present invention respectively.

As the carbonblack used in the present invention, there may be mentioned various kinds of carbonblacks such as contact black, furnace black, thermal black, lamp black, acetylene black and channel black which may be commercially available. These carbonblack particles have a particle size of about 0.01 $\mu m$ to 0.1 $\mu m$. As mentioned above, various kinds of carbonblack may be used in the present invention, however, it is preferable to use carbonblacks having a low oil absorption. When a carbonblack of high oil absorption is used, the shelf life thereof is liable to be low due to the large surface area and high activity thereof and therefore, the use of such carbonblack is not preferable.

In the electric discharge recording material of the present invention, the carbonblack included in the colored layer functions not only as a coloring agent but also a conductive material. In other words, the presence of carbonblack enables the recording material to reduce spark noises due to the discharge during the recording operation and to prevent it from causing discharge on the return electrode.

On the other hand, when in the colored layer, relatively a large amount of carbonblacks is present in the state of insufficient dispersion, a kind of local cell is formed between the deposited metal and carbonblack, the corrosion of the deposited metal is caused, and the surface of the products are blackened during storage.

Thus, in the present invention, carbonblack used is subjected to a particular treatment and then the pretreated carbonblack is mixed with an adhesive to form a composition for colored layer.

The pretreatment of carbonblack is effected by using a plasticizer. The plasticizers which are in a liquid or semi-solid state at ambient temperature may be used in the present invention. Usually, the plasticizers which are known as a plasticizer for resin and are comercially available are used.

Typical example of the plasticizer includes phthalates, fatty acid esters, maleates, fumerates, trimellitates, glycerol esters such as glyceroltriacetate, polyester type plasticizers of adipic acids, sebacic acids or phthalic acids, having a molecular weight of about 500 to 8000, or epoxylated ester type plasticizer of epoxylated aliphatic acid esters and epoxylated oils.

Among the above mentioned examples, it is usually preferable to use a plasticizer in liquid state in view of the easiness of handling. The larger the molecular weight of the plasticizer used, the greater the aggregation effects that may be attained. Moreover, these plasticizers may be used by themselves or as a mixture of two or more of them.

A method for dispersing carbonblack with a plasticizer comprises, for examples, dispersing carbonblack powder into a plasticizer or a solution of a plasticizer which includes a suitable amount of solvent to allow the plasticizer to maintain a liquid state, thereby to separate the carbonblack into its particulate state (usually the size thereof being in a range of 0.01 to 0.1 μm), to permit the particles to adsorb sufficient amount of the plasticizer on the surface thereof in order to cover the particles with the plasticizer.

In the said dispersing process, the plasticizer is preferably used in an amount at least about 10 parts by weight per 100 parts by weight of carbonblack (hereinunder, all "parts" stand for parts by weight). However, since the percentage between these two materials varies to some extent depending on the oil adsorption of the carbonblack used and the kind of the plasticizer used, the said proportion is not critical. While if the amount of the plasticizer used is insufficient, the dispersion efficiency of the carbonblack reduces and insufficient adsorption and incomplete coverage of the carbonblack particles is resulted and therefore, it becomes difficult to form aggregate particles of carbonblack hereinunder described and the desired purpose of the present invention cannot be attained.

As a solvent used to render the plasticizer to liquid state, usual hydrocarbons, alcohols, ethers, ketones, Cellosolves, esters or well known and commonly used organic solvents may be used in the present invention. While the solvent is preferably a good solvent of resins for binder, since in the subsequent process a resin for binder or a solution thereof is used to remix or redisperse the said carbonblack particles.

Of course, in the present invention, poor solvents for binder resins may be used. In such a case, firstly the plasticizer is dissolved in such solvent and carbonblack is mixed therewith or dispersed therein. Then, in the subsequent step in which a binder resin is mixed with carbonblack particles, a good solvent for the binder resins is added to produce a coating composition being capable of dissolving the resin.

The ratio between a plasticizer and a solvent may vary within a wide range and is not critical. In any event, those skilled in the art may determine an optimum proportion therebetween, taking the efficiency of dispersion and the workability into consideration.

In the preparation of a composition for forming the colored layer according to the present invention, a binder resin (or a solution thereof) is used as hereinbefore described. As the binder resin, thermoplastic resins or heat curable resins which are commonly used to prepare a colored layer of the discharge recording materials may be used. Typical examples include polyvinyl acetate, polyvinyl chloride, vinyl chloride-vinyl acetate copolymer, polyvinyl acetal, polyvinyl butyral, acrylic resins, methacrylic resins, cellulosic resins, polyester resins, epoxy resins. These resins may be used as a combination of two or more of them. In particular, taking (1) the aggregation effect of carbonblack particles; (2) the odor of the discharge recording material during recording; (3) the phenomenon of leaving a tail of an image during discharge recording and the like into consideration, the use of the cellulosic resins is preferable among the said various kinds of resins.

The illustrative examples of said cellulosic resin include nitrocellulose, cellulose acetate, cellulose acetic butyrate, cellulose propionate, ethylcellulose and the like which may be soluble in an usual organic solvent. These cellulosic resins may be used as a mixture of two or more of them. Any conventional means for mixing or dispersing the carbonblack may be used in the present invention. There may be mentioned, for example roll mill, ball mill, pebble mill, sand mill, attritor, colloid mill, stone mill, rapid impact mill or rapid impeller dispersion machine as a means for dispersion.

Thus, the coating composition for forming a colored layer may be obtained by admixing or dispersing a carbonblack dispersed solution with a binder resin or a solution thereof.

According to the present invention, the carbonblack pretreated with a plasticizer has a mean diameter within a range of from about 0.5 to 5.0μ and may form aggregated particles having a relatively uniform particle size in the mixing or the dispersion step (see FIG. 1).

The discharge recording material thus obtained as final product by incorporating the said carbonblack aggregates having a relatively uniform particle size of 0.5 to 5.0μ into the colored layer has the following excellent properties:

(1) Due to the uniform roughness of the surface thereof, the pseudo-whitening of the surface is excellent (almost the same as that of the usual paper) and the contrast between the image area and the nonimage area is very high and thereby the image is very clear. In order to attain acceptable effect of pseudo-whitening, the mean particle size of the aggregated particles is preferably at least 0.5μ;

(2) Since the surface of the recording paper has a uniform convex portion and a concave portion, during the discharge recording, suitable degree of contact resistance is provided between the recording needle and the surface of the recording paper and between the return electrode and the recording paper, and thereby a stable discharge recording is obtained and the generation of the discharge under the return electrode is prevented;

(3) Since the mean particle size of the carbonblack aggregates (0.5 to 5.0μ) is relatively large compared with the usual particulate carbonblack of 0.01 to 0.1μ, when the recording potential is applied, the discharge is induced on individual carbonblack aggregates and plurality of split discharges are generated thereon. Therefore, instantaneous lumped discharges are prevented to cause a mild discharge, the reproducibility of dots is excellent and the recording image is sharp and thus clear recording is obtained;

(4) Since the surface of individual particulate carbonblacks which form carbonblack aggregates is covered with a hydrophobic plasticizer and the aggregates have a relatively large particle size, the contact surface area is totally small and thereby, the corrosion of the deposited metal is prevented and good storage stability is provided.

In the foregoing passage, it was described that preferably cellulosic resins are used. However, they include resins having poor suppleness depending on the kind thereof if the colored layer is formed therefrom. Consequently, inclusive of a use of cellulosic resins, if one intends to impart flexibility or suppleness to the colored layer, known resins having flexibility or suppleness or known plasticizers may be added in the mixing or dispersion step.

The coating composition thus obtained is applied onto a supporting material such as paper according to a conventional method to form a colored layer on the support, then deposited metal layer is formed thereon.

The colored layer is formed by applying the composition comprising carbonblack and a binder as main constituents on a supporting material such as paper according to a conventional method so that the amount of application is generally within a range of from about 1 to 10 g/m$^2$ based on the dry weight thereof.

The said deposited metal layer may be formed according to any one of the conventional method. For example, by employing vacuum deposition method, a layer of a metal such as Al, Zn, Sn, Mg may be formed on said colored layer.

The thickness of the metal layer to be deposited is preferably within the range of from about 50 to 2000 A, or 20 to 1.0 Ω/square (JIS C-2316) expressed as a value of the surface resistance.

According to the present invention, a protective layer which comprises various kinds of resin or a mixture of resins, pigment such as zinc oxide and titanium dioxide, and lubricant such as fatty acid-metal soaps may be formed on the metal layer according to need to form a discharge recording material as a final product.

The present invention may be explained more concretely referring to the following non-limitative examples.

EXAMPLES 1 TO 4

A mixed solution, the formulations A hereinunder specified, was introduced into a glass container together with glass beads and the mixture was treated by employing a paint conditioner (Toyo Seiki, Inc.) for 4 hours to obtain carbonblack treated with a plasticizer. Then, to 20 g of the carbonblack treated with a plasticizer obtained, 80 g of a mixture, the formulations B including the following constituents, was added and the mixture obtained was poured into a glass vessel together with glass beads, and then mixed and dispersed by a paint conditioner for 1 hour. A colored layer was formed by applying the composition for the colored layer on a wood free paper of 50 g/m$^2$ so that the amount of application is equal to 4 g/m$^2$ based on the dry weight. After the formation of the colored layer, aluminium was deposited on the colored layer so that the surface resistance thereof was 3 Ω/square to form a discharge recording materials (an electronmicrograph of which was shown on FIG. 3). In addition, as a control, another discharge recording materials were prepared according to the same procedure except for using a composition obtained by charging 20 g of the formulations A wherein carbonblack particles were not pretreated with a plasticizer and 80 g of the formulations B into a paint conditioner and treating the mixture for the same period (5 hours) to attain uniform dispersion (an electronmicrograph shown in FIG. 2).

Tests on the recording properties and storage stability were carried out with respect to the discharge recording materials obtained. The results are shown in table 1.

Samples No. 1' to No. 4' as controls correspond to samples Nos. 1 to 4 of the present invention respectively.

Formulations A:

Carbonblack (Seast-S by Tokai Carbon Co., Ltd.)—12 g,

Plasticizer (see table 1)—20 g,

Ethyl acetate—48 g.

Formulations B:

Nitrocellulose (RS-2, by Daicel, Ltd.)—10 g,

Ethyl acetate—70 g,

TABLE 1

| | Sample No. | Plasticizer used | Particle size of carbonblack aggregate (μ)*1 | Discharge under return electrode*2 | Appearance of the deposited surface*3 | Recording property*4 | Storage stability*5 |
|---|---|---|---|---|---|---|---|
| Present Invention | 1 | dioctyl phthalate | about 1.5 | O | O | O | O |
| | 2 | trioctyl trimellitate | about 2.0 | O | O | O | O |
| | 3 | BAA15 (polyester type)*6 | " | O | O | O | O |
| | 4 | SO (epoxylated soybean | " | O | O | O | O |

TABLE 1-continued

| | Sample No. | Plasticizer used | Particle size of carbonblack aggregate (μ)*1 | Discharge under return electrode*2 | Appearance of the deposited surface*3 | Recording property*4 | Storage stability*5 |
|---|---|---|---|---|---|---|---|
| | | oil)*7 | | | | | |
| Control | 1' | dioctyl phthalate | no aggregation | Δ | X | X | X |
| | 2' | triocytl trimellitate | " | Δ | X | X | X |
| | 3' | BAA15 (polyester type) | " | Δ | X | X | X |
| | 4' | SO (epoxylated soybean oil) | " | Δ | X | X | X |

*1The particle size was determined by the observation of the electronmicrograph (approximate mean particle size).
*2The discharge under a return electrode was estimated by employing a printer Model CSP-3 manufactured by Nippon Aleph Co., Ltd. (recording voltage 35 V).
O not generated
Δ generated sometimesX generated frequently
*3O having pseudo-whitened, natural appearance
X having strong metallic luster and less natural appearance
*4The test on writing quality was carried out by writing with a pencil of HB specification
O good
X bad
*5The estimation was carried out by standing the samples to be tested in a environment of 40° C. and 90% RH, for 10 days.
O almost no corrosion
X cause corrosion badly
*6Adipic acid 1,3-butylene glycolic polyester type plasticizer (molecular weight: about 1500), manufactured by Daihachi Chemical Industry Co., Ltd.
*7Epoxylated soybean oil manufactured by Daihachi Chemical Industry Co., Ltd. (molecular weight: about 1000).

It is found from the results shown in the table 1 that carbonblack aggregates were formed in any of the discharge recording materials, obtained by using carbonblack particles pretreated with a plasticizer according to the present invention and that the discharge recording materials of the present invention are more excellent in various properties than those of the controls wherein carbonblack particles used were not pretreated with a plasticizer.

EXAMPLE 5

To a glass vessel, a mixed solution of the formulations C hereinunder specified was charged together with glass beads and the mixture was admixed with a paint conditioner for 4 hours to obtain carbonblack pretreated with a plasticizer. To 15 g of said carbonblack solution, 80 g of a mixture of the formulations D hereinunder specified was added and the mixture obtained was poured into a glass vessel together with glass beads, thereafter said mixture was mixed and dispersed with a paint conditioner for 1 hour to form a coating composition for the colored layer. Then, the colored layer was prepared by applying the said coating composition to a wood free paper of 50 g/m$^2$ so that the amount of the composition is 4 g/m$^2$ based on the dry weights. On this colored layer, aluminium was deposited so that the surface resistance of said deposited layer is 3Ω/square to obtain a discharge recording material.

In addition, as control sample another discharge recording material was produced according to the same procedure except for using a coating composition prepared by introducing 15 g of the mixture of the formulations C wherein the carbonblack particles were not pretreated with a plasticizer and 80 g of the mixture of the formulations D together with glass beads into a glass vessel and charging the mixture to a paint conditioner then dispersing the mixture at one-stage process for 5 hours (sample No. 5'). Furthermore, still another discharge recording material was prepared according to the same procedure except for using a coating composition, obtained by adding 2 g of finely divided silica powder (Syloid-65, by Fuji Davison Chemical Ltd.) to 100 g of the said coating composition obtained by one-stage dispersion process and dispersing the mixture by a paint conditioner for additional 1 hour (sample No. 5"). The tests on the recording properties and storage stability were carried out with respect to the discharge recording materials obtained under the same conditions as in Example 1. The results obtained are shown in the table 2.

Formulations C:
Carbonblack (Asahi #35, by Asahi Carbon Co., Ltd.)—15 g
Epoxylated oil type plasticizer (Epocizer-W-100EL, by Dainippon Ink & Chemicals Inc.)—15 g
Toluene—50 g
Formulations D:
Nitrocellulose*1 (RS-2, by Daicel, Ltd.)—10 g
Plasticizer (DOP by Daihachi Chemical Industry, Co., Ltd.)—1 g,
Cellosolve—20 g,
Butyl acetate—49 g.

*1: Degree of nitration (N%): 11.5–12.2 Viscosity: 15.0 to 24.0 sec.

TABLE 2

| Sample No.*8 | Particle size of carbonblack aggregate (μ) | Discharge under return electrode | Reproducibility of dots*9 | Appearance of the deposited surface | Writing property | Storage stability |
|---|---|---|---|---|---|---|
| 5 | about 2 | O | O | O | O | O |
| 5' | no aggregation | Δ | O | X | X | X |

TABLE 2-continued

| Sample No.*8 | Particle size of carbonblack aggregate (μ) | Discharge under return electrode | Reproducibility of dots*9 | Appearance of the deposited surface | Writing property | Storage stability |
|---|---|---|---|---|---|---|
| 5'' | no aggregation | X | X | O | O | X |

*8Sample No. 5 is the recording material according to the present invention, sample No. 5' is a control wherein carbonblack particles are not pretreated with a plasticizer and sample No. 5'' is another control wherein the colored layer is formed from a coating composition obtained by adding silica as a surface roughening agent to a coating composition of sample No. 5'.
*9The estimation is carried out by recording with a printer Model CSP-3 (by Nippon Aleph, Co., Ltd.).
O good reproducibility of dots and clear record
X bad reproducibility of dots and less clear record It is found from the results of table 2 that the carbonblack aggregate is clearly formed in the sample of the present invention (No. 5) and that the sample of this invention is excellent in the writing property and the storage stability compared with the control samples (Nos. 5' and 5'').

EXAMPLES TO 6 10

To a glass vessel, a mixture of the formulations E hereinunder specified was added together with glass beads and the mixture was dispersed in a paint conditoiner for 4 hours to form carbonblack particles pretreated with a plasticizer. Then, to a glass vessel, 15 g of the pretreated carbonblack particles and 100 g of a mixture of the formulations F hereinunder specified was added together with glass beads and the mixture was dispersed in a paint conditioner for additional 1 hour to obtain a paint composition for the colored layer. The colored layer was formed by applying said paint composition on a wood free paper of 50 g/m$^2$ so that the amount of application is 4 g/m$^2$ based on the dry weight. Then, on the colored layer formed, aluminium was deposited so that the surface resistance is 3Ω/square to obtain discharge recording materials.

As a control, a discharge recording materials was prepared according to the same procedure except for using a coating composition obtained by charging 15 g of the formulations E wherein carbonblack particles were not pretreated and 100 g of the formulation F to a paint conditioner and dispersing the mixture for 5 hours at one-step dispersion process.

Tests on various properties of the discharge recording material were carried out under the same condition as in Example 1 with respect to the products obtained according to these Examples and obtained results shown in table 4. These results show excellent cellulosic resins among the binder resins.

Formulations E:

Carbonblack (Seast-S, by Tokai Carbon, Co., Ltd.)—15 g

Plasticizer (Epocizer-W-100EL, by Dainippon Ink & Chemicals, Inc.)—10 g

Solvent (see table 3)—55 g

Formulations F:

The binder resin (see table 3) was dissolved in a solvent shown in table 3 so that the solid content is equal to 10% by weight.

TABLE 3

| Example No. | Binder Resins and Solvent used: Binder Resin | Solvent |
|---|---|---|
| 6 | nitrocellulose*1 (RS½, by Daicel Ltd.) | methylethylketone |
| 7 | ethylcellulose*2 (N-50, by Hercules, Inc.) | ethylalcohol |
| 8 | vinylchloride-vinylacetate copolymer (S-LEC-C, by Sekisui Chemical Co., Ltd.) | ethylacetate |
| 9 | polyvinyl butylal resin (S-LEC-BMS, by Sekisui Chemical Co., Ltd.) | methylethylketone |
| 10 | acrylic resin Acrylic A-159 by Japan Reinhold Chemicals, Inc.) | toluene |

*1Degree of nitration (N%): 11.5 to 12.2 Viscosity:9.0 to 14.9 sec.
*2Ethoxyl content: 47.5 to 49.0% Viscosity:40 to 52 cps.

TABLE 4

| Ex. No. | Binder Resin | Particle size of carbonblack aggregate (μ) | Discharge under return electrode | Appearance of deposited surface |
|---|---|---|---|---|
| 6 | nitrocellulose | about 1.5 | O | O |
| 7 | ethylcellulose | about 2.0 | O | O |
| 8 | vinylchloride-vinylacetate copolymer | about 0.7 | O | Δ |
| 9 | polyvinyl butyral resin | about 1 | O | O |
| 10 | acrylic resin | about 1 | O | O |

EXAMPLE 11

On the deposited metal layer of the discharge recording material obtained by Example 6, a solution hereinunder described was applied so that the amount of application is 0.5 g/m$^2$ based on the dry weight to prepare a discharge recording material having a protective layer. When the discharge recording material thus obtained was recorded with a printer model CSP-3 (by Nippon Aleph, Co., Ltd.), a clear printed image having no discharge under return electrode and inconspicuous scanning lines was obtained.

Moreover, it was excellent in the storage stability.

Formulations:

Ethylcellulose* (N-10, Hercules, Inc.)—5 g

Ethylalcohol—95 g

*1: Ethoxyl content: 47.5 to 49.0% Viscosity: 8 to 11 cps.

What is claimed is:

1. A discharge recording material which comprises a support, a colored layer on the support, and a metal layer deposited on the colored layer, the colored layer comprising carbonblack aggregates and a binder as main components, the carbonblack aggregates having a mean size within a range of from 0.5 to 5.0μ and being an aggregate of carbonblack particles coated with a plasticizer.

2. A discharge recording material as set forth in claim 1 which further comprises a protective layer on the metal layer.

3. A discharge recording material as set forth in claim 1 or 2 wherein the plasticizer is a member selected from the group consisting of phthalates, fatty acid esters, maleates, fumerates, trimellitates, glycerol esters, polyester type plasticizers of adipic acid, sebacic acid or phthalic acid, having a molecular weight of about 500 to 8000, or epoxylated ester type plasticizers.

4. A process for preparing a discharge recording material which comprises the steps of:

(i) treating carbonblack powder with a plasticizer and sufficiently adsorbing the plasticizer on the surface of the carbonblack particles to cover the particles and to disperse them in the form of individual particles, then mixing the carbonblack particles thus pretreated with the plasticizer and with a binder and dispersing them to produce a composition for a colored layer, containing carbonblack aggregates having a mean size within a range of from 0.5 to 5.0$\mu$;

(ii) applying said composition on a support to form the colored layer; and (iii) depositing a metal onto the colored layer to form a deposited layer.

5. A process for preparing a discharge recording material as set forth in claim 4 wherein the amount of the plasticizer used is at least 10 parts by weight per 100 parts by weight of carbonblack.

6. A process for preparing a discharge recording material as set forth in claim 4 which includes the additional step of forming a protective layer on the deposited metal layer.

7. A process for preparing a discharge recording material as set forth in claim 6 wherein the amount of the plasticizer used is at least 10 parts by weight per 100 parts by weight of carbonblack.

8. A process for preparing a discharge recording material as set forth in claim 4, 5 or 7 wherein the plasticizer is a member selected from the group consisting of phthalate, fatty acid esters, maleates, fumarates, trimellitates, glycerol esters, polyester type plasticizers of adipic acids, sebacic acids or phthalic acid, having a molecular weight of about 500 of 8,000 or epoxylated ester type plasticizers.

* * * * *